United States Patent
He

(10) Patent No.: US 6,707,981 B2
(45) Date of Patent: Mar. 16, 2004

(54) VARIABLE OPTICAL ATTENUATION COLLIMATOR WITH CONTROLLABLE LIGHT BLOCKING MECHANISMS

(75) Inventor: Yi He, Saratoga, CA (US)

(73) Assignee: Global Opticom, Inc., Santa Clara, CA (US)

( * ) Notice: Subject to any disclaimer, the term of this patent is extended or adjusted under 35 U.S.C. 154(b) by 153 days.

(21) Appl. No.: 10/078,219

(22) Filed: Feb. 15, 2002

(65) Prior Publication Data
US 2003/0156816 A1 Aug. 21, 2003

(51) Int. Cl.[7] .............................. G02B 6/00; G02B 6/26
(52) U.S. Cl. ............................ 385/140; 385/34; 385/73
(58) Field of Search ..................... 385/140, 34, 73, 385/19

(56) References Cited

U.S. PATENT DOCUMENTS

| | | | | |
|---|---|---|---|---|
| 5,857,048 A | * | 1/1999 | Feuer et al. | 385/88 |
| 5,943,454 A | * | 8/1999 | Aksyuk et al. | 385/22 |
| 6,181,846 B1 | * | 1/2001 | Pan | 385/18 |
| 6,390,689 B1 | * | 5/2002 | Azimi et al. | 385/88 |
| 2003/0156815 A1 | * | 8/2003 | He | 385/140 |
| 2003/0156816 A1 | * | 8/2003 | He | 385/140 |

* cited by examiner

Primary Examiner—Rodney Bavernick
Assistant Examiner—Mike Stahl
(74) Attorney, Agent, or Firm—Pacific Law Group LLP; Chi Ping Chang

(57) ABSTRACT

A concept of designing a Variable Optical Attenuation Collimator (VOAC) is disclosed to achieve a variable degree of optical power attenuation through the collimator by adding an Attenuation Control Element (ACE) between a lens element and fiber pigtails of a traditional fiber optical collimator. The body of the ACE can be implemented in many different forms of a light blocker element capable of being controllably moved into a main light path of the VOAC to obstruct a controlled portion of light power. The light blocker can be a Micro Electro Mechanical Structure (MEMS) operating with a controlled electrostatic force, a bimetal wire driven by a controlled heating current, an electrical current-carrying wire within a surrounding permanent magnetic field or a deflectable permanent magnetic wire within a controlled surrounding magnetic field.

30 Claims, 5 Drawing Sheets

Fig. 1B View A-A of Fig. 1A

Fig. 1C View A-A of Fig. 1A

Fig. 2A
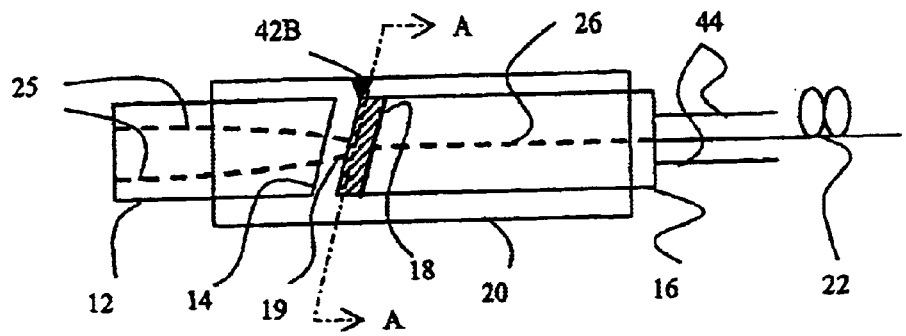
Fig. 2B View A-A of Fig. 2A
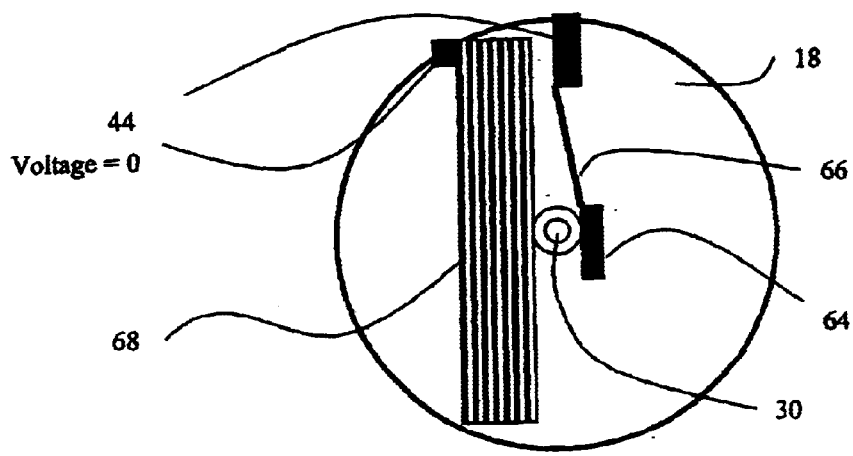
Fig. 2C View A-A of Fig. 2A
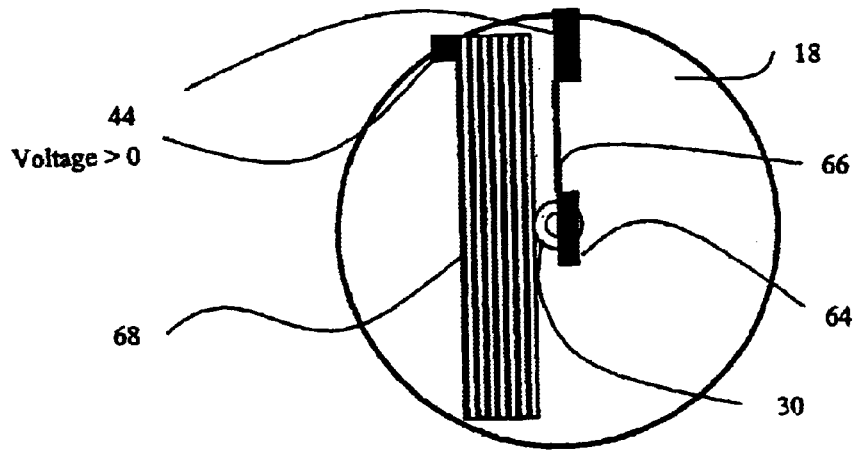
Fig. 2

Fig. 3A
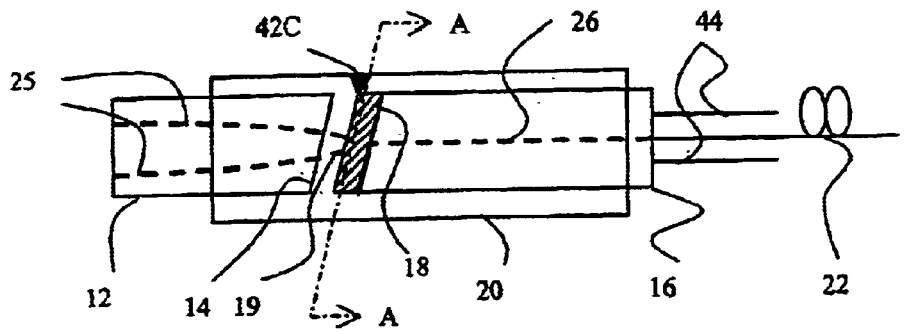
Fig. 3B View A-A of Fig. 3A
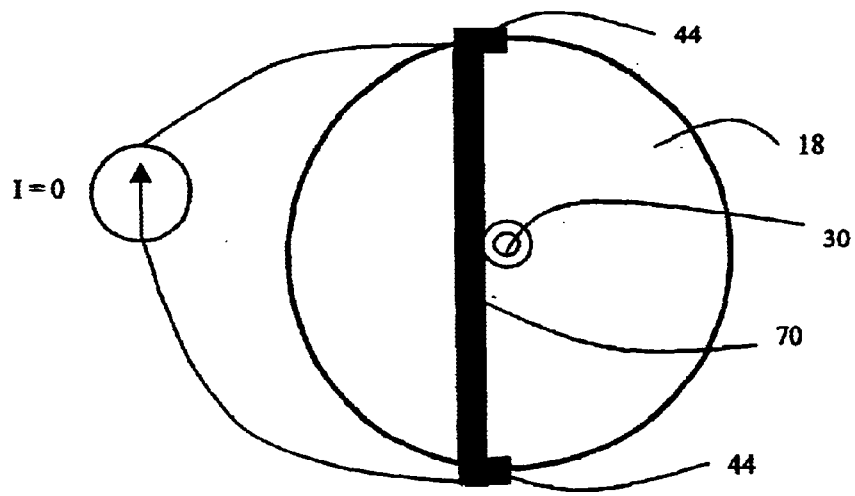
Fig. 3C View A-A of Fig. 3A
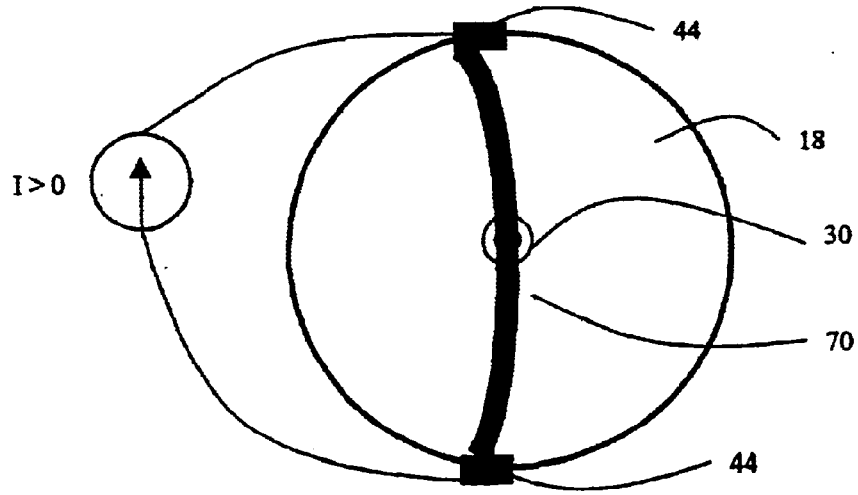
Fig. 3

Fig. 4A
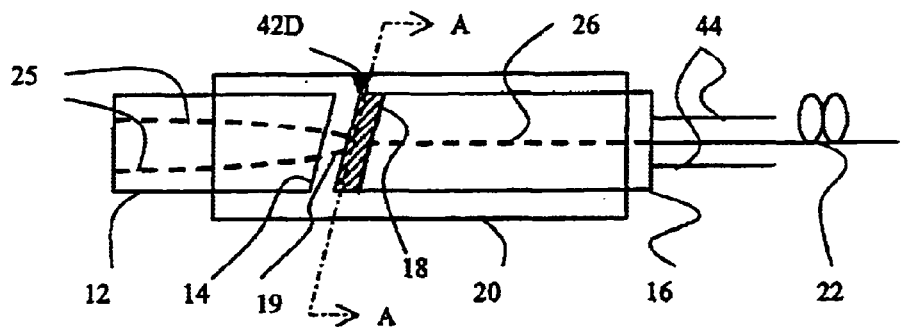
Fig. 4B View A-A of Fig. 4A
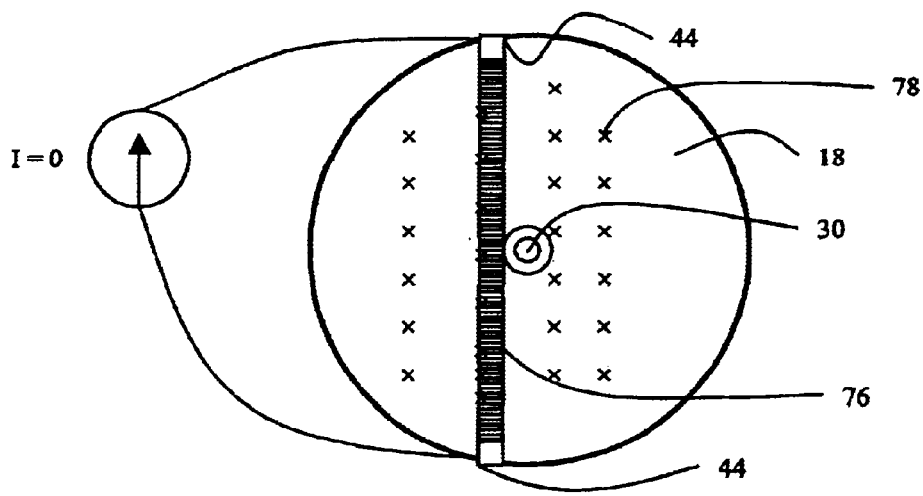
Fig. 4C View A-A of Fig. 4A
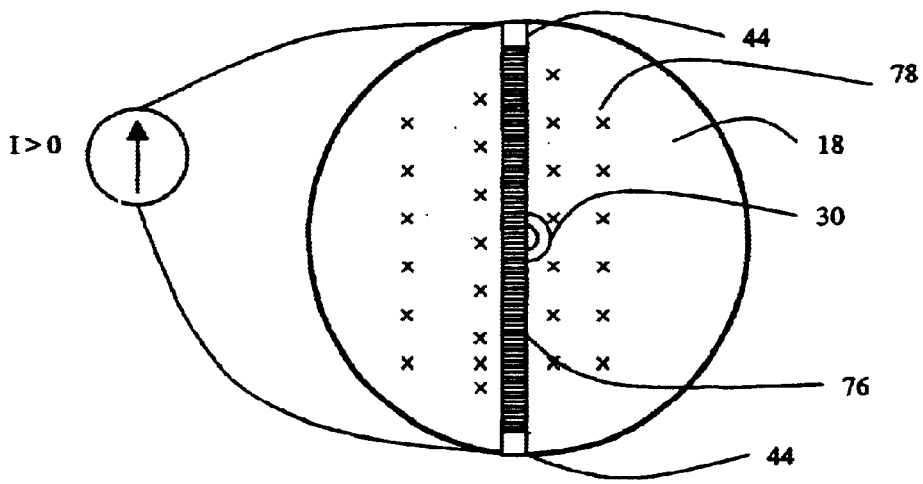
Fig. 4

Fig. 5A
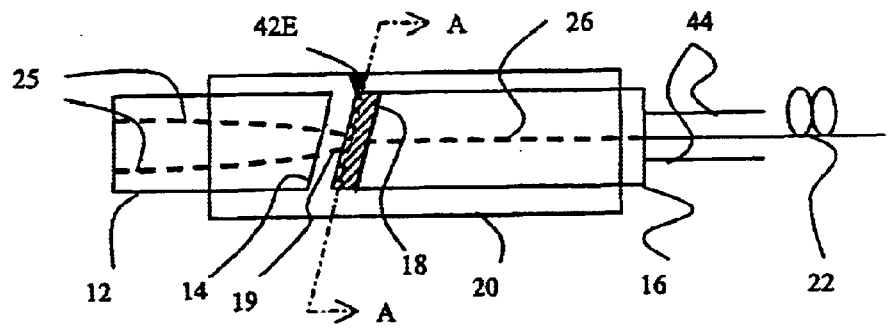
Fig. 5B View A-A of Fig. 5A
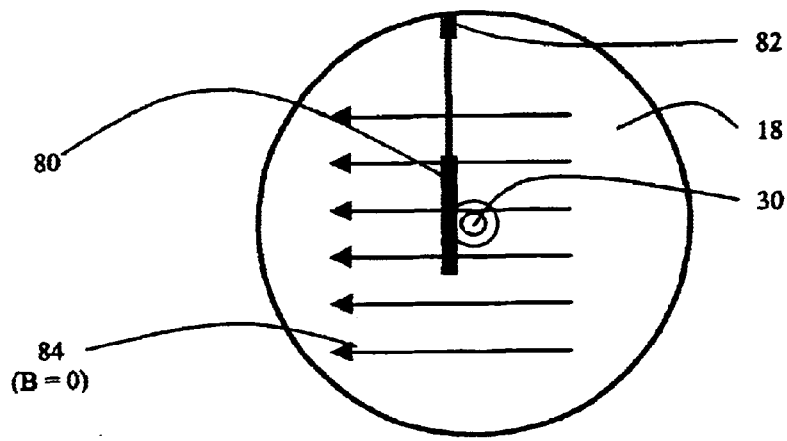
Fig. 5C View A-A of Fig. 5A
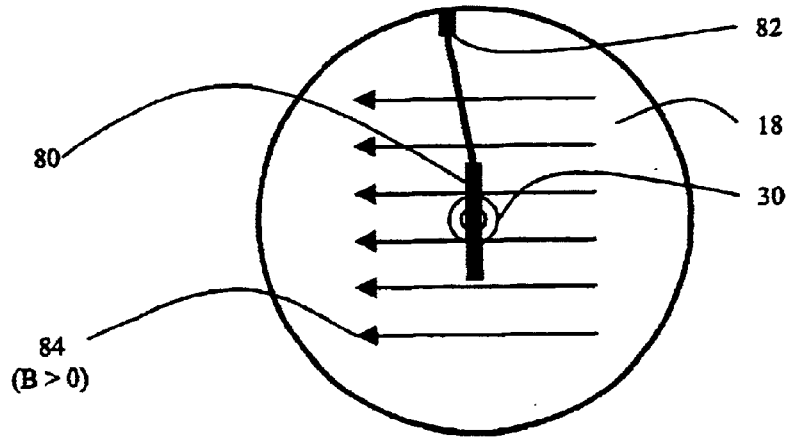
Fig. 5

VARIABLE OPTICAL ATTENUATION COLLIMATOR WITH CONTROLLABLE LIGHT BLOCKING MECHANISMS

CROSS REFERENCE TO RELATED APPLICATION

This patent application is a companion application of a concurrently filed application directing to a similar subject matter with the title of "A VARIABLE OPTICAL ATTENUATION COLLIMATOR" by the same inventor.

FIELD OF THE INVENTION

The present invention relates generally to the field of fiber optical components used in fiber optical communications. More particularity, the present invention discloses a number of concepts for the designing and manufacturing of Variable Optical Attenuation Collimator (VOAC) so as to control the amount of light power propagating through a fiber optical collimator.

BACKGROUND OF THE INVENTION

The industry of fiber optical communications has already proven to be indispensable for the achievement of low noise, long distance telecommunication with a heretofore-unrealizable high bandwidth. Within a fiber optical network a Variable Optical Attenuator (VOA) is an important basic component with the function of controlling the propagated level of light power, such as a single-channel VOA or a VOA array. The VOA can be combined with other fiber optical components to form modules of a higher level of functionality, such as a Dense Wavelength Division Multi-plexer (DWDM), an Optical Add/Drop Multiplexer (OADM) and a Programmable Optical Add/Drop Multi-plexer (POADM). For example, in a DWDM, the optical power level of each channel is changed after it passes through Erbium-Doped Fiber optical Amplifiers (EDFAs) and associated fibers. In this case, a VOA is one of the simplest solutions to balancing the optical power level amongst the various wavelengths.

Recently, the need and the art of making the VOA has increased substantially due to the demand of real-time, dynamic light power management within a fiber optical system, especially as the market attention turns from long-haul systems toward metro-systems and even local networks and fiber delivery to individual homes.

However, to date, there has been a general lack of suitable VOA products in the market. For example, to meet the explosively growing traffic demand a high channel-count transmission system will need to accommodate many VOAs in a compact package (the VOA array), which may cause many undesirable effects to the system including, but without limitation to, such problems as pigtail handling and VOA array set-up. To solve such problems commercially, the VOA or VOA array must feature a variety of properties such as small size, consistent and stable attenuation, short response time, very high reliability, easy-to-use while being low cost. Currently, there are three kinds of VOA or VOA array in the market, they are opto-mechanical VOA devices using stepper motor or magneto-optical crystal, VOA arrays based upon waveguide technology and VOAs or VOA arrays based upon MEMS-on-wafer technology where MEMS stands for Micro Electro Mechanical Structure. Unfortunately, none of these existing VOAs or VOA arrays can simultaneously realize all the just-mentioned features.

For example, while the opto-mechanical VOAs are capable of providing consistent and stable attenuation by using stepper motor or magneto-optic crystalto drive a shutter or light blocker into a light beam to obstruct part or all of the light power, they can not be minimized to meet the needs of high channel-count integration due to the bulky size of the stepper motor or the electro-magnetic coil. Essentially, the major drawbacks are their bulkiness, long response time, difficulty of system integration and high cost. On the other hand, the waveguide VOAs, while being suitable for high channel-count integration, are lack of consistent and stable attenuation expressed in the form of high insertion loss, high Polarization Dependent Loss (PDL), high Polarization Mode Dispersion (PMD) and sensitivity to ambient temperature. The temperature sensitivity is caused by a differential coefficient of temperature change of the refractive index between the waveguide material and an attached glass fiber core. Additionally, there is difficulty of system integration in the sense that it is difficult to couple light into and out of the ends of the waveguide due to mode difference of the propagating light between the waveguide and an attached fiber. The drawbacks of the MEMS VOA are similar to that of the waveguide VOA. The MEMS VOA usually leaves a narrow air gap between two fiber ends to allow the insertion of a MEMS shutter into the light path. While the MEMS VOA is suitable for assembly into an array by placing the fibers and shutters onto a MEMS wafer, the associated insertion loss, return loss and temperature dependence can not be easily perfected due to the presence of this air gap and the requirement of maintaining parallelism between the end surfaces of the fibers.

SUMMARY

The present invention is directed to a number of concepts of designing the Attenuation Control Element (ACE) within the VOAC to perform the function of the aforementioned VOA or VOA arrays while featuring small size, consistent and stable attenuation, short response time, very high reliability, easy-to-use and low cost.

The first objective of this invention is to provide for a VOAC that achieves a consistent and stable attenuation.

The second objective of this invention is to provide for a VOAC that is compact in size.

The third objective of this invention is to provide for a VOAC that achieves a short response time.

The fourth objective of this invention is to provide for a VOAC that is low cost.

Other objectives, together with the foregoing are attained in the exercise of the invention in the following description and resulting in the embodiment illustrated in the accompanying drawings.

BRIEF DESCRIPTION OF DRAWINGS

The current invention will be better understood and the nature of the objectives set forth above will become apparent when consideration is given to the following detailed description of the preferred embodiments. For clarity of explanation, the detailed description further makes reference to the attached drawings herein:

FIG. 2A, FIG. 2B and FIG. 2C illustrate a second embodiment of the design and operation of the ACE within the VOAC;

FIG. 3A, FIG. 3B and FIG. 3C illustrate a third embodiment of the design and operation of the ACE within the VOAC;

FIG. 4A, FIG. 4B and FIG. 4C illustrate a fourth embodiment of the design and operation of the ACE within the VOAC; and FIG. 5A, FIG. 5B and FIG. 5C illustrate a fifth embodiment of the design and operation of the ACE within the VOAC;

DETAILED DESCRIPTION OF THE PREFERRED EMBODIMENTS

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessary obscuring aspects of the present invention.

Reference herein to "one embodiment" or an "embodiment" means that a particular feature, structure, or characteristics described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1A:
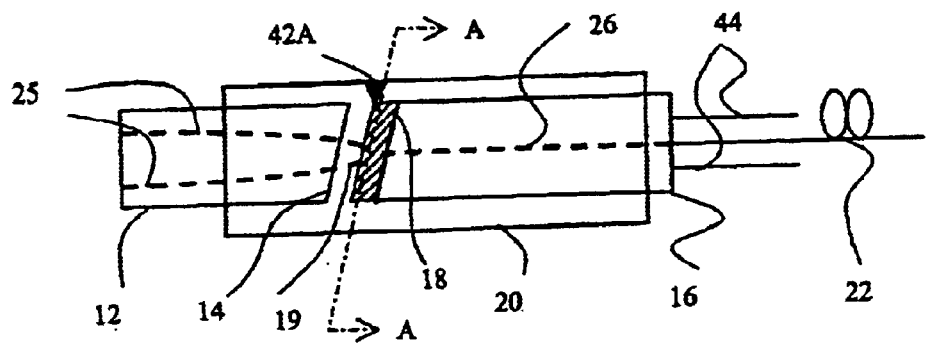
FIG. 1A, FIG. 1B and FIG. 1C illustrate a first embodiment of the design and operation of the ACE within the VOAC.
Figure 1:
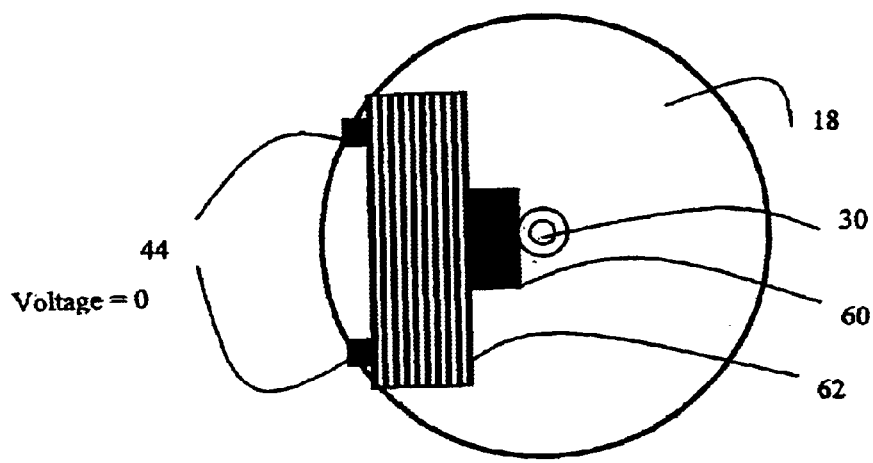
Figure 1:
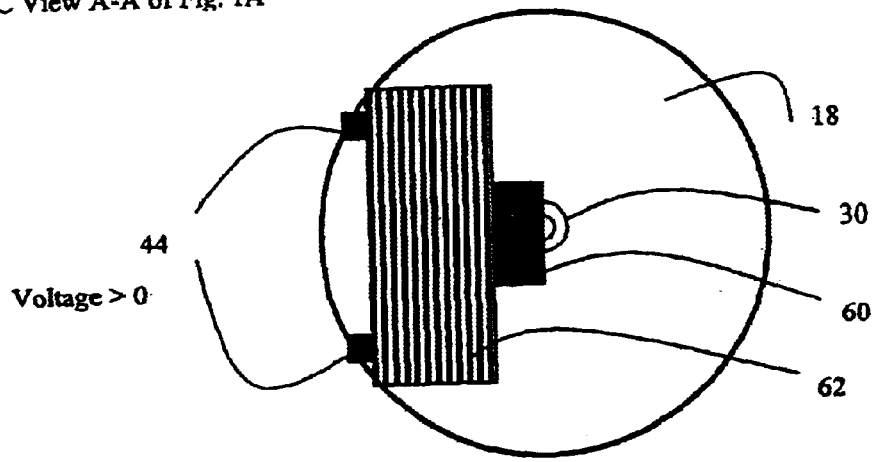

FIG. 1A, FIG. 1B and FIG. 1C illustrate a first structure and operation of a multi-fiber optical collimator of the present invention. The traditional parts of the structure is described below:

A lens 12 is separated from a pigtail 16 with an air gap 19. The lens 12 and the pigtail 16 are affixed to a common housing tube 20. The right end of the pigtail 16 is attached to a fiber assembly 22 containing one or more optical fibers. Typically, as is well known in the art, the lens 12 is made of an appropriate GRaded INdex of refraction (GRIN) lens whereby a laser light entering the left end of the lens 12 is automatically focused onto the proper entry point of the pigtail 16 for further propagation along the pigtail 16 with minimum light loss. This is illustrated with an intra-lens light path 25 and an intra-pigtail light path 26. Finally, the light enters the fiber assembly 22 from the right end of the pigtail 16 for further propagation. Notice that, as is also well known in the art, both the lens 12 and the pigtail 16 have tilted, with respect to the optical axis, yet parallel to each other surfaces for the maximization of return loss. These are tilted lens surface 14 and tilted pigtail surface 18 respectively. Notice also, in the air gap 19, the diameter of a propagating light beam is quite small. Near the tilted pigtail surface 18 the light beam diameter is only of the order of 9 $\mu$m (micrometer). From optical reciprocity, another situation wherein the light enters the structure from the right end of the fiber assembly 22 works just as well.

An ACE body of a first type of Micro Electro Mechanical Structure (MEMS) of the present invention, called ACE MEMS-A body and designated as 42A, is mounted onto the tilted pigtail surface 18 within the existing air gap 19. The detailed structure of the ACE MEMS-A body 42A is illustrated in a VIEW A—A of FIG. 1B. The ACE MEMS-A body 42A comprises a MEMS-A light blocker 60 mounted on a MEMS-A spring 62 having a pair of ACE control electrodes 44 attached thereto for the application of an externally supplied control voltage. The placement of the MEMS-A light blocker 60 is such that it just clears a pigtail fiber end surface 30 through it a main light beam propagates. The pigtail fiber end surface 30, being co-planar with the tilted pigtail surface 18, is part of and located at the left end of the pigtail 16. The connection between the ACE control electrodes 44 and the ACE MEMS-A body 42A, being blocked from view by the pigtail 16, is not directly visible in FIG. 1A. The surface of the MEMS-A light blocker 60 is either made of or coated with a light absorptive material. The MEMS-A spring 62 has a structure of a multi-layer condenser. Under the application of an external voltage across the ACE control electrodes 44, static electricity is generated on the many internal surfaces of the condenser layers, the resulting repulsive force amongst these layers pushes the MEMS-A spring 62 to expand so as to push the mounted MEMS-A light blocker 60 into the main path of a propagating light beam. Thus, in the absence of an externally supplied control voltage there is essentially no optical power attenuation through the ACE MEMS-A body 42A. This is illustrated in FIG. 1B with Voltage=0. However, with the application of an externally supplied control voltage Voltage>0, the MEMS-A spring 62 expands and pushes the MEMS-A light blocker 60 into a path of the main light beam at the pigtail fiber end surface 30 so as to obstruct and absorb a corresponding amount of propagating light power causing an equivalent amount of optical power attenuation through the ACE MEMS-A body 42A. This function of a VOAC is illustrated in FIG. 1C. As the ACE MEMS-A body 42A is added in the existing air gap 19 of a traditional fiber optical collimator, there is no incremental size impact on the collimator resulting in a very compact VOAC. Additionally, the inherent property of precision and repeatability of the MEMS structure offers the advantages of high reliability plus consistent and stable attenuation.

FIG. 2A, FIG. 2B and FIG. 2C illustrate a second structure and operation of a multi-fiber optical collimator of the present invention. The traditional parts of the structure are the same as those described in FIG. 1A.

An ACE body of a second type of MEMS of the present invention, called ACE MEMS-B body and designated as 42B, is mounted onto the tilted pigtail surface 18 within the existing air gap 19. The detailed structure of the ACE MEMS-B body 42B is illustrated in a VIEW A—A of FIG. 2B. The ACE MEMS-B body 42B comprises a MEMS-B light blocker 64 mounted on a movable MEMS-B cantilever 66. The surface of the MEMS-B light blocker 64 is either made of or coated with a light absorptive material. The MEMS-B light blocker 64 is located at the right side of and it just clears the pigtail fiber end surface 30 through it a main light beam propagates. A stationary MEMS-B base 68, being oriented with its face opposing that of the MEMS-B light blocker 64 and the movable MEMS-B cantilever 66, is located at the left side of and it just clears the pigtail fiber end surface 30. The far ends of both the movable MEMS-B cantilever 66 and the MEMS-B base 68 have a pair of ACE control electrodes 44 attached thereto for the application of an externally supplied control voltage. Thus, under the application of an externally supplied control voltage, an electrostatic attractive force is developed between the assembly of MEMS-B light blocker 64 and movable MEMS-B cantilever 66 and the MEMS-B base 68, pulling the MEMS-B light blocker 64 in front of the pigtail fiber end surface 30 to obstruct and absorb a corresponding amount of propagating light power there through. Hence, in the absence of an externally supplied control voltage there is essentially no optical power attenuation through the ACE MEMS-B body 42B. This is illustrated in FIG. 2B with Voltage=0. However, with the application of an externally supplied control voltage>0, the MEMS-B light blocker 64 gets pulled into a path of the main light beam at the pigtail fiber end surface 30 so as to obstruct and absorb a corresponding amount of propagating light power causing an equivalent amount of optical power attenuation through the ACE MEMS-B body 42B. This function of a VOAC is illustrated in FIG. 2C.

FIG. 3A, FIG. 3B and FIG. 3C illustrate a third structure and operation of a multi-fiber optical collimator of the present invention. The traditional parts of the structure are the same as those described in FIG. 1A.

An ACE bimetal body 42C of the present invention is mounted onto the tilted pigtail surface 18 within the existing air gap 19. The detailed structure of the ACE bimetal body 42C is illustrated in a VIEW A—A of FIG. 3B. The ACE bimetal body 42C comprises a bimetal wire light blocker 70 with a pair of attached ACE control electrodes 44 for the supply of an externally provided heating current. The surface of the bimetal wire light blocker 70 is either made of or coated with a light absorptive material. The bimetal wire light blocker 70 is located at one side of and it just clears the pigtail fiber end surface 30 through it a main light beam propagates. Thus, under the application of an externally supplied heating current, an internal bending force is developed within the bimetal wire light blocker 70 from the differential thermal expansion coefficients of its two metallic constituents, forcing the center part of the bimetal wire light blocker 70 in front of the pigtail fiber end surface 30 to obstruct and absorb a corresponding amount of propagating light power there through. Hence, in the absence of an externally supplied heating current there is essentially no optical power attenuation through the ACE bimetal body 42C. This is illustrated in FIG. 3B with current I=0. However, with the application of an externally supplied heating current I>0, the bimetal wire light blocker 70 gets forced into a path of the main light beam at the pigtail fiber end surface 30 so as to obstruct and absorb a corresponding amount of propagating light power causing an equivalent amount of optical power attenuation through the ACE bimetal body 42C. This function of a VOAC is illustrated in FIG. 3C. Due to the simplicity and minimum number of low cost parts of the ACE bimetal body 42C, it offers the advantages of low cost, high reliability and reduced demand of special packaging.

FIG. 4A, FIG. 4B and FIG. 4C illustrate a fourth structure and operation of a multi-fiber optical collimator of the present invention. The traditional parts of the structure are the same as those described in FIG. 1A.

An ACE conductive wire body 42D of the present invention is mounted onto the tilted pigtail surface 18 within the existing air gap 19. The detailed structure of the ACE conductive wire body 42D is illustrated in a VIEW A—A of FIG. 4B. The ACE conductive wire body 42D comprises a conductive wire light blocker 76 with a pair of attached ACE control electrodes 44 for the supply of an externally provided control current. Additionally, the conductive wire light blocker 76 is elastically and slidably mounted onto the tilted pigtail surface 18 with the associated direction of movement being parallel to the tilted pigtail surface 18 while perpendicular to the direction of the conductive wire light blocker 76. For example, a means of mounting the conductive wire light blocker 76 can be through a pair of miniature springs although they are not shown here for simplicity of view. The surface of the conductive wire light blocker 76 is either made of or coated with a light absorptive material. The conductive wire light blocker 76 is located at one side of and it just clears the pigtail fiber end surface 30 through it a main light beam propagates. Furthermore, a permanent magnetic field 78, illustrated with a number of small "x" in FIG. 4B and FIG. 4C, surrounding the conductive wire light blocker 76 is provided by a permanent magnetic means, not shown here for simplicity, around the conductive wire light blocker 76. For example, the permanent magnetic field 78 can be supplied by a permanent magnetic ring mounted onto the lens 12. For another example, the permanent magnetic field 78 can also be supplied by a permanent magnetic block mounted at another position near the conductive wire light blocker 76 while still supplying the permanent magnetic field 78 with a proper field vector direction. Thus, under the application of an externally supplied control current through the conductive wire light blocker 76, an induced magnetic force perpendicular to the direction of the conductive wire light blocker 76 is developed moving the conductive wire light blocker 76 in front of the pigtail fiber end surface 30 to obstruct and absorb a corresponding amount of propagating light power there through. Hence, in the absence of an externally supplied control current there is essentially no optical power attenuation through the ACE conductive wire body 42D. This is illustrated in FIG. 4B with current I=0. However, with the application of an externally supplied control current I>0, the conductive wire light blocker 76 gets moved into a path of the main light beam at the pigtail fiber end surface 30 so as to obstruct and absorb a corresponding amount of propagating light power causing an equivalent amount of optical power attenuation through the ACE conductive wire body 42D. This function of a VOAC is illustrated in FIG. 4C. As the permanent magnetic field 78 can be made very strong and the size of the conductive wire light blocker 76 be made very small, the corresponding response time of the VOAC can be made very fast.

FIG. 5A, FIG. 5B and FIG. 5C illustrate a fifth structure and operation of a multi-fiber optical collimator of the present invention. The traditional parts of the structure are the same as those described in FIG. 1A.

An ACE permanent magnetic wire body 42E of the present invention is mounted onto the tilted pigtail surface 18 within the existing air gap 19. The detailed structure of the ACE permanent magnetic wire body 42E is illustrated in a VIEW A—A of FIG. 5B. The ACE permanent magnetic wire body 42E comprises a permanent magnetic light blocker 80 having an elastically deflectable body and mounted, at a pivot 82, onto the tilted pigtail surface 18 with the associated direction of deflection being parallel to the tilted pigtail surface 18 while perpendicular to the direction of the permanent magnetic light blocker 80. The surface of the permanent magnetic light blocker 80 is either made of or coated with a light absorptive material. The permanent magnetic light blocker 80 is located at one side of and it just clears the pigtail fiber end surface 30 through it a main light beam propagates. Furthermore, a controllable magnetic field 84, illustrated with a number of short left-pointing arrows in FIG. 5B and FIG. 5C, surrounding the permanent magnetic light blocker 80 is provided by a structure of electro-magnetic coils, not shown here for simplicity, around the permanent magnetic light blocker 80. The electro-magnetic coils are supplied with a control current from a controlled current source external to the ACE permanent magnetic wire body 42E. For example, the electro-magnetic coils can be implemented around the lens 12. For another example, the electro-magnetic coils can also be implemented around the pigtail 16 while still supplying the controllable magnetic field 84 with a proper field vector direction. Thus, under the application of an externally supplied control current through the electro-magnetic coils, an induced magnetic force perpendicular to the direction of the permanent magnetic light blocker 80 is developed deflecting the permanent magnetic light blocker 80 in front of the pigtail fiber end surface 30 to obstruct and absorb a corresponding amount of propagating light power there through. Hence, in the absence of an externally supplied control current to the electro-magnetic coils the magnetic field strength of the controllable magnetic field 84 is zero and there is essentially no optical power attenuation through the ACE permanent magnetic wire body 42E. This is illustrated in FIG. 5B with B=0. However, with the application of an externally supplied control current to the electro-magnetic coils a controllable magnetic field 84 of a controlled field strength is generated, deflecting the permanent magnetic light blocker 80 into a path of the main light beam at the pigtail fiber end surface 30 so as to obstruct and absorb a corresponding amount of propagating light power causing an equivalent amount of optical power attenuation through the ACE permanent magnetic wire body 42E. This function of a VOAC is illustrated in FIG. 5C with B>0. As the controllable magnetic field 84 can be made very strong and the size of the permanent magnetic light blocker 80 be made quite small, the corresponding response time of the VOAC can be made very fast. Also, a high level of reliability can be expected here from the simple deflective motion of the permanent magnetic light blocker 80.

All of the aforementioned five exemplary embodiments have a light-weight movable member as the light blocker and thus can realize very good specifications of optical performance, including low IL, low PDL, low PMD, high RL and low WDL within a very wide wavelength range. By the same token, the stability and consistency of operation are also guaranteed. Among the five embodiments, the bimetal design shown in FIG. 3 has the best operating stability albeit with a relatively long response time. While considering the manufacturing process and materials cost, we can expect that the designs shown in FIG. 3, FIG. 4 and FIG. 5 require very low cost.

As described with five exemplary cases of design, a variety of Attenuation Control Element is disclosed, all based upon the principle of using a light blocking element to partially or completely block off the propagation of light power, for the inclusion into a Variable Optical Attenuation Collimator to perform its function with corresponding advantages specific to the designs. The invention has been described using exemplary preferred embodiments. However, for those skilled in this field, the preferred embodiments can be easily adapted and modified to suit additional applications without departing from the spirit and scope of this invention. Thus, it is to be understood that the scope of the invention is not limited to the disclosed embodiments. On the contrary, it is intended to cover various modifications and similar arrangements based upon the same operating principle. The scope of the claims, therefore, should be accorded the broadest interpretations so as to encompass all such modifications and similar arrangements.

What is claimed are the following:

1. A multi-fiber, Variable Optical Attenuation Collimator (VOAC) for providing a variable degree of optical power attenuation to a light beam propagating therethrough, comprising:
    a lens and a pigtail separated by an air gap wherein the lens and the pigtail is affixed to a common housing tube in such a manner that the light beam entering at a left end of the lens is automatically focused onto a proper entry point of the pigtail for further propagation along the pigtail to define a main light path;
    a fiber assembly containing one or more optical fibers attached to a right end of the pigtail; and
    an Attenuation Control Element (ACE) movably mounted onto a surface of the pigtail within the air gap in close proximity to, yet clear of the main light path; and
    a control means connected to the ACE to provide a controllable movement of the ACE to obstruct all or a portion of the light beam propagating through the main light path from the pigtail to the fiber assembly to achieve the variable degree of optical power attenuation.

2. The multi-fiber, Variable Optical Attenuation Collimator (VOAC) of claim 1 wherein the ACE is a Micro Electro Mechanical Structure (MEMS) light blocker.

3. The multi-fiber, Variable Optical Attenuation Collimator (VOAC) of claim 2 wherein the control means is a number of MEMS electrodes to generate an electrostatic force in the presence of an externally applied voltage to push the MEMS light blocker into the main light path to obstruct a controlled portion of light power propagating therethrough.

4. The multi-fiber, Variable Optical Attenuation Collimator (VOAC) of claim 1 wherein the ACE is a bimetal wire light blocker.

5. The multi-fiber, Variable Optical Attenuation Collimator (VOAC) of claim 4 wherein the control means is a number of electrodes to generate a bending force to the bimetal wire light blocker in the presence of an externally applied heating current such that a portion of the bimetal wire light blocker moves into the main light path to obstruct a controlled portion of light power.

6. The multi-fiber, Variable Optical Attenuation Collimator (VOAC) of claim 1 wherein the ACE is a movable and electrically conductive wire light blocker.

7. The multi-fiber, Variable Optical Attenuation Collimator (VOAC) of claim 6 wherein the control means comprises a number of electrodes to provide a controllable amount of electrical current through the wire light blocker in the presence of a current source external to the VOAC.

8. The multi-fiber, Variable Optical Attenuation Collimator (VOAC) of claim 7 wherein the control means further comprises a number of permanent magnetic structures being mounted near the wire light blocker supplying a surrounding permanent magnetic field and having a magnetic field direction substantially perpendicular to the direction of the wire light blocker such that the wire light blocker is pushed into the main light path to obstruct a controlled portion of light power when there is an amount of electrical current flowing through the said wire light blocker.

9. The multi-fiber, Variable Optical Attenuation Collimator (VOAC) of claim 1 wherein the ACE is a deflectable permanent magnetic wire light blocker made of a permanent magnetic material and is oriented generally in a plane parallel to a surface of the lens.

10. The multi-fiber, Variable Optical Attenuation Collimator (VOAC) of claim 9 wherein the control means comprises a number of electro-magnetic coils mounted near the deflectable permanent magnetic wire light blocker whereby, when a controllable amount of electrical current is caused to flow through the electro-magnetic coils by an current source external to the VOAC, the deflectable permanent magnetic wire light blocker is deflected into the main light path by magnetic force to obstruct light beam along the main light path to cause a corresponding amount of optical power attenuation.

11. An Attenuation Control Element (ACE) for providing a variable degree of optical power attenuation to a light beam propagating through a multi-fiber, Variable Optical Attenuation Collimator (VOAC) that comprises a lens, a pigtail and a fiber assembly containing one or more optical fibers wherein the lens and the pigtail is affixed to a common housing tube and is separated by an air gap in such a manner that the light beam entering at a left end of the lens is automatically focused onto a proper entry point of the pigtail for further propagation along the pigtail to the fiber assembly to define a main light path, the ACE comprising:

an ACE body movably mounted onto a surface of the pigtail within the air gap in close proximity to, yet clear of the main light path; and a control means connected to the ACE body to provide a controllable movement of the ACE body to obstruct all or a portion of the light beam propagating through the main light path from the pigtail to the fiber assembly to achieve the variable degree of optical power attenuation.

12. The Attenuation Control Element (ACE) of claim 11 wherein the ACE body is a Micro Electro Mechanical Structure (MEMS) light blocker.

13. The Attenuation Control Element (ACE) of claim 12 wherein the control means is a number of MEMS electrodes to generate an electrostatic force in the presence of an externally applied voltage to push the MEMS light blocker into the main light path to obstruct a controlled portion of light power propagating therethrough.

14. The Attenuation Control Element (ACE) of claim 11 wherein the ACE body is a bimetal wire light blocker.

15. The Attenuation Control Element (ACE) of claim 14 wherein the control means is a number of electrodes to generate a bending force to the bimetal wire light blocker in the presence of an externally applied heating current such that a portion of the bimetal wire light blocker moves into the main light path to obstruct a controlled portion of light power.

16. The Attenuation Control Element (ACE) of claim 11 wherein the ACE body is a movable and electrically conductive wire light blocker.

17. The Attenuation Control Element (ACE) of claim 16 wherein the control means comprises a number of electrodes to provide a controllable amount of electrical current through the wire light blocker in the presence of a current source external to the VOAC.

18. The Attenuation Control Element (ACE) of claim 17 wherein the control means further comprises a number of permanent magnetic structures mounted near the wire light blocker supplying a surrounding permanent magnetic field and having a magnetic field direction substantially perpendicular to the direction of the wire light blocker such that the wire light blocker is pushed into the main light path to obstruct a controlled portion of light power when there is an amount of electrical current flowing through the said wire light blocker.

19. The Attenuation Control Element (ACE) of claim 11 wherein the ACE body is a deflectable permanent magnetic wire light blocker made of a permanent magnetic material and is oriented generally in a plane parallel to a surface of the lens.

20. The Attenuation Control Element (ACE) of claim 19 wherein the control means comprises a number of electro-magnetic coils mounted near the deflectable permanent magnetic wire light blocker whereby, when a controllable amount of electrical current is caused to flow through the electro-magnetic coils by an current source external to the VOAC, the deflectable permanent magnetic wire light blocker is deflected into the main light path by magnetic force to obstruct light beam along the main light path to cause a corresponding amount of optical power attenuation.

21. A method of making a multi-fiber, Variable Optical Attenuation Collimator (VOAC) for providing a variable degree of optical power attenuation to a light beam propagating therethrough, comprising the steps of:

providing a lens and a pigtail separated by an air gap wherein the lens and the pigtail is affixed to a common housing tube in such a manner that the light beam entering at a left end of the lens is automatically focused onto a proper entry point of the pigtail for further propagation along the pigtail to define a main light path;

attaching a fiber assembly containing one or more optical fibers to a right end of the pigtail; and movably mounting an Attenuation Control Element (ACE) onto a surface of the pigtail within the air gap in close proximity to, yet clear of the main light path; and providing a control means to the ACE to provide a controllable movement of the ACE to obstruct all or a portion of the light beam propagating through the main light path from the pigtail to the fiber assembly to achieve the variable degree of optical power attenuation.

22. The method of making a multi-fiber, Variable Optical Attenuation Collimator (VOAC) of claim 21 wherein the ACE is a Micro Electro Mechanical Structure (MEMS) light blocker.

23. The method of making a multi-fiber, Variable Optical Attenuation Collimator (VOAC) of claim 22 wherein the control means is a number of MEMS electrodes to generate an electrostatic force in the presence of an externally applied voltage to push the MEMS light blocker into the main light path to obstruct a controlled portion of light power propagating therethrough.

24. The method of making a multi-fiber, Variable Optical Attenuation Collimator (VOAC) of claim 21 wherein the ACE is a bimetal wire light blocker.

25. The method of making a multi-fiber, Variable Optical Attenuation Collimator (VOAC) of claim 24 wherein the control means is a number of electrodes to generate a bending force to the bimetal wire light blocker in the presence of an externally applied heating current such that a portion of the bimetal wire light blocker moves into the main light path to obstruct a controlled portion of light power.

26. The method of making a multi-fiber, Variable Optical Attenuation Collimator (VOAC) of claim 21 wherein the ACE body is a movable and electrically conductive wire light blocker.

27. The method of making a multi-fiber, Variable Optical Attenuation Collimator (VOAC) of claim 26 wherein the control means comprises a number of electrodes to provide a controllable amount of electrical current through the wire light blocker in the presence of a current source external to the VOAC.

28. The method of making a multi-fiber, Variable Optical Attenuation Collimator (VOAC) of claim 27 wherein the control means further comprises a number of permanent magnetic structures being mounted near the wire light blocker supplying a surrounding permanent magnetic field and having a magnetic field direction substantially perpendicular to the direction of the wire light blocker such that the wire light blocker is pushed into the main light path to obstruct a controlled portion of light power when there is an amount of electrical current flowing through the wire light blocker.

29. The method of making a multi-fiber, Variable Optical Attenuation Collimator (VOAC) of claim 21 wherein the ACE body is a deflectable permanent magnetic wire light blocker made of a permanent magnetic material and is oriented generally in a plane parallel to a surface of the lens.

30. The method of making a multi-fiber, Variable Optical Attenuation Collimator (VOAC) of claim 29 wherein the control means comprises a number of electro-magnetic coils mounted near the deflectable permanent magnetic wire light blocker whereby, when a controllable amount of electrical current is caused to flow through the electro-magnetic coils by an current source external to the VOAC, the deflectable permanent magnetic wire light blocker is deflected into the main light path by magnetic force to obstruct light beam along the main light path to cause a corresponding amount of optical power attenuation.

* * * * *